3,443,896
CATALYTIC METHOD FOR THE RECOVERY OF SULPHURIC ACID IN A PLURALITY OF CONTACT-AND-ABSORPTION STEPS
Herbert Furkert, Grosskonigsdorf, Friedrich Mahler, Cologne-Nippes, Heinrich Peters, Lovenich, and Adolf Stauffer, Pulheim, Germany, assignors to Firma Chemiebau Dr. A. Zieren G.m.b.H., Cologne-Braunsfeld, Germany, a corporation of Germany
Filed Sept. 22, 1965, Ser. No. 489,310
Claims priority, application Germany, Sept. 25, 1964, C 33,961
Int. Cl. C01b 17/72
U.S. Cl. 23—168                3 Claims

ABSTRACT OF THE DISCLOSURE

Sulfuric acid is produced from sulfur dioxide containing gases utilizing a multi-stage catalytic sulfur dioxide oxidation and a two-stage sulfur trioxide absorption. The first absorption stage is arranged before the last oxidation stage and the second absorption stage is arranged after the last oxidation stage. The sulfur trioxide free exhaust gas leaving the first absorption stage is reheated to the starting temperature for the last oxidation stage with the heat obtained by combustion of sulfur or hydrogen sulfide, by roasting of sulfide ores, or by decomposition of waste sulfuric acid.

---

The present invention relates to a catalytic method for the recovery of sulfuric acid in a plurality of contact and absorption stages, in general, and for the recovery of sulfuric acid from dry, substantially dust-free sulfur burning gases in a plurality of contact and absorption stages, in particular.

It is an object of the present invention to provide an economical multi-stage process for the catalytic conversion of $SO_2$ to $SO_3$. Other objects and advantages will in part be obvious and will in part become apparent from the specification.

In one aspect of the invention, hot $SO_2$-containing gases obtained from a sulfur burner are passed through a heat exchanger, where these hot sulfur burner gases heat the effluent gases from the first $SO_3$-absorption to about 410° C. to 430° C. and are themselves simultaneously cooled to about 460° C. to 430° C. The cooled $SO_2$ rich gases then enter the first contact stage. For the adjustment of the most favorable initial temperature of the catalytic oxidation in the first contact layer, cold dried air may be added. After traversing the first catalyst layer, the reaction gas is directly cooled with dried air. After passage through the second layer, heat is taken off by production or superheating of steam. After the third layer, 85 to 90% of the $SO_2$ has been transformed to $SO_3$. The gases are cooled down by steam production to between 200° C. and 180° C. and then passed up through an absorption tower provided with concentrated sulfuric acid which absorbs the $SO_3$. The effluent gas from the first $SO_3$ absorption after being freed from entrained spray, moves through the aforementioned heat exchanger and then to the fourth catalyst layer and is there transformed to $SO_3$ in an amount from 99.7 to 99.9% of the original $SO_2$. After cooling to between 200° C. and 180° C. by the production of steam, the remaining $SO_3$ is also absorbed in a tower of concentrated sulfuric acid, and the residual gases are exhausted into the atmosphere.

Figure 1:
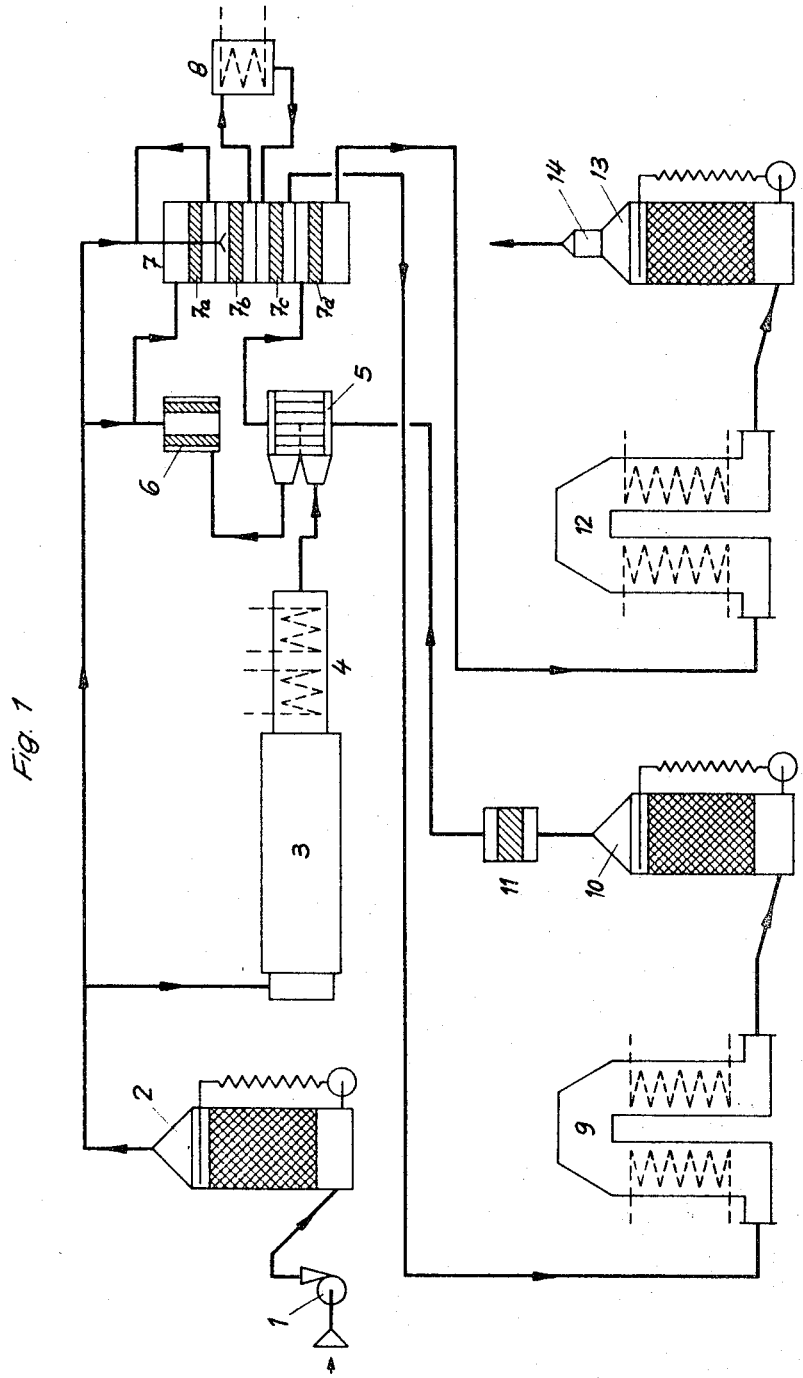

The method according to the present invention is shown schematically in FIGURE 1 of the drawing. The blower 1 pushes air through the drying tower 2 into the sulfur furnace 3 having a waste heat boiler 4. The gases are then passed into the heat exchanger 5 where the burner gases transfer sufficient heat to the effluent gases received from the intermediate absorber 10 via the spray separator 11, as is required to heat the effluent gases to the starting temperature for the last contact stage 7d. The burner gas which is not yet completely cooled to the starting temperature of the first contact stage 7a, is freed by filter 6 from small quantities of dust, and if necessary, is cooled with dried air exactly to the required temperature and is then fed to the contact apparatus 7. The converted gas is admixed with dried air prior to the second layer 7b outside of the contact vessel 7, in order to control the temperature and the oxygen content. Prior to the third layer 7c, the reaction gas flows through the steam generator or steam superheater 8. After passage through this layer, 85 to 95% of the original $SO_2$ has been converted to $SO_3$. The gases are cooled down in the steam generator 9 to about 180° C. and are passed through the first absorber 10 in which they transfer their $SO_3$ to circulating sulfuric acid. After passage through the contact layer 7d, 99.7 to 99.9% of the original $SO_2$ quantity has been converted to $SO_3$. The gases are cooled in the waste heat boiler 12 to about 180° C. and fed through a second absorber 13 with the spray cleaner 14. The $SO_3$ absorption is practically complete. The effluent gases from the second absorber contain only 0.1 to 0.3% of the worked $SO_2$-quantity.

In accordance with German Patent No. 442,036, after the first absorption, heat of the catalytic reaction is used for the reheating of the gases. The examples relate to gases with 10 to 12% $SO_2$. In German published patent application 1,136,988, a similar method of multistage $SO_2$-catalysis and $SO_3$-absorption is described for gases containing 9 to 12% $SO_2$, which concentration could likewise be obtained from the combustion of sulfur. An exchange of heat of the effluent gases of the first absorption with the reaction gas of one contact stage takes place. For this purpose relatively large heat exchangers are required with the high $SO_2$ concentrations in the gases and in particular uniform plant conditions are necessary when compared with the process of this invention. Older plants, which work with $SO_2$-concentrations below 10%, can be changed over, if at all, only with appreciable costs to this known process using a plurality of contact and absorption stages.

The method in accordance with the present invention does not have these drawbacks, because the sulfur combustion always releases more heat than is required for the reheating of the effluent gases of the first absorption, and because the sulfur burner gas is much hotter than the reaction gas at the exit of the next to last contact stage. It is for this reason suitable for gases of any conventional $SO_2$ concentration including concentrations less than 9%, e.g. as low as 6%, and more than 12% $SO_2$. Furthermore, the high temperature differences of the two gases in the heat exchanger appreciably reduce the necessary heating area in comparison with the known methods.

The method in accordance with the present invention does not require any specific $SO_2$-content, because the heat content and the temperature of the sulfur burner gas always suffice to reheat the effluent gas of the first $SO_3$-absorption to temperatures at which the oxidation in the last contact stage starts safely and simultaneously to maintain the $SO_2$-containing sulfur burner gas at a sufficient temperature for the start of the oxidation in the first contact stage. This is of particularly importance for shutdowns. The heat exchanger becomes so hot within a short time after startup of the sulfur burner that the last contact stage can be started as rapidly as the preceding ones.

In accordance with B. Waeser, "Die Schwefelsäurefabrikation," 1961, page 323, and B. Waeser, "Handbuch der Schwefelsäurefabrikation," 1930, page 1671 and pages 1676 to 1677, it is known that the heat of the sulfur burner gases can be used for the preheating of the cooled and cleaned $SO_2$-gas for the contact oxidation. Furthermore, since heat of the contact oxidation is also used for this purpose, the old method is distinguished from the method of the present invention. For processes with a plurality of contact and absorption stages, sulfur burner gas has not been used yet for the preheating of the effluent gases of the first absorption.

It is a further object of the present invention to provide a catalytic process for production of sulfuric acid from a gases from roasting, gases from the combustion of hydrogen sulfide or unclean sulfur, as well as from gases obtained by splitting of waste sulfuric acid in a plurality of contact and absorption stages. Such gases having a temperature of e.g. 900° C. flow through a heat exchanger, the exchanging walls of which can be maintained without difficulty at for instance 350° C., in order to avoid encrustation by lead and arsenic compounds or other materials having a high dew point. Steam vessels had to work for this purpose at pressures of over 160 atmospheres above atmospheric pressure. Dust depositions on the heating surfaces can be removed by jarring or other cleaning measures, for instance, falling balls striking onto the boiler tubes so that the heat exchange suffices for the requirements. The effluent gases from the first absorption which are heated to about 410° C. to 430° C. are then introduced into the fourth contact layer, where the catalytic oxidation of the $SO_2$ to $SO_3$ is concluded with a total yield of 99.5 to 99.9%. The reaction gas is cooled by the steam production to the usual temperature for the entrance into the second $SO_3$ absorption. The roaster gas is, after passing through the aforementioned heat exchanger, freed from dust, cooled, washed, defogged, dried and reheated by means of heat of the catalytic oxidation, released in the first, second or third contact layer and fed into the contact apparatus. The reaction gas, after the first or the second contact layer, transfers heat to the cleaned roaster gas, is used to produce steam, and, after passage through the third layer, is used to heat the cleaned roaster gas, and is then passed through the first $SO_3$ absorption in which the main quantity of the sulfuric acid is formed.

Figure 2:
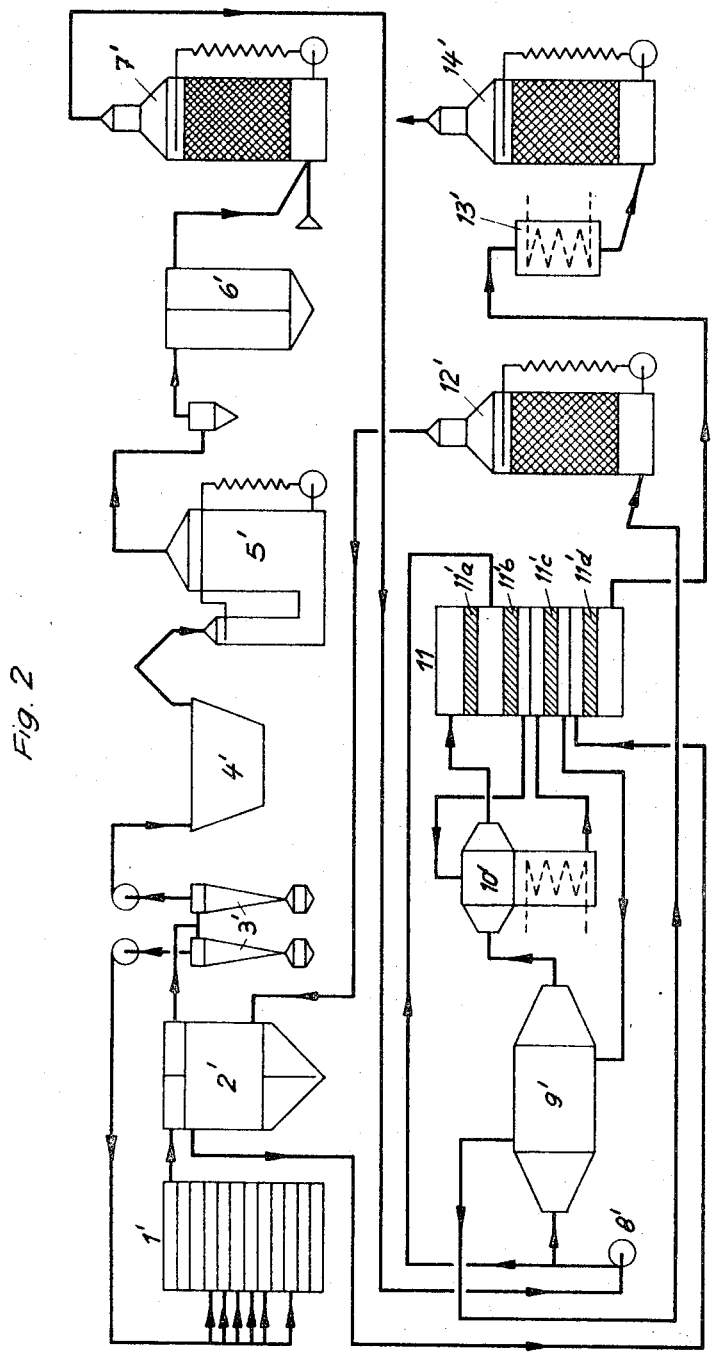

FIGURE 2 is the scheme of the afore-described process in accordance with the present invention. The roaster gas coming from the multi-hearth furnace flows through the heat exchanger $2^1$, where it heats the effluent gas of the first absorber $12^1$ to the starting temperature of the fourth contact layer $11^1d$. At the bottom of the heat exchanger $2^1$ dust can be removed which is collected during the cleaning of the heating surfaces. Further dust removal is accomplished by cyclones $3^1$, the effluent gas from one of them being returned to the multi-hearth furnace in order to increase the $SO_2$-concentration of the pyrite roaster gases to between 11 and 12% $SO_2$. The remaining gases from cyclone $3^1$ are passed to the electrostatic precipitator $4^1$ and to the cooling and washing device $5^1$ and then to the spray remover and the wet electrostatic precipitator $6^1$ in which the remaining dust particles, smoke and fog are removed. After passage through the drying tower $7^1$, the roaster gases are conveyed, if necessary, upon adjustment of the $SO_2$- and $O_2$-concentrations by in-sucked air by means of the blower $8^1$ through the heat exchangers $9^1$ and $10^1$ into the contact apparatus 11. In the exchangers the reaction gas transfers heat released in the contact layers $11^1a$, $11^1b$ and $11^1c$ to the roaster gas in order to heat it up to the starting temperature of layer $11^1a$. After this layer $11^1a$, cold roaster gas coming from blower $8^1$ is admixed to the reaction gas as a temperature control. After the second layer $11^1b$, the reaction gas flows through the intermediate heat exchanger $10^1$ designed as a waste heat boiler or steam superheater and returns to the third layer $11^1c$. Eighty-five to 95% of the original $SO_2$-quantity of the gas is now converted to $SO_3$. It then leaves the contact apparatus through the exchanger $9^1$ and enters into the first $SO_3$ absorber $12^1$. The effluent gas from the latter is reheated in the exchanger 21 and is converted in the contact layer $11^1d$ to a total of 99.5 to 99.9% of the original $SO_2$-quantity. After cooling in the waste heat boiler $13^1$, the reaction gas passes through the second absorber $14^1$ and leaves it substantially free of $SO_3$. The waste gas contains only 0.1 to 0.5% of the $SO_2$-quantity initially present in the dried roaster gas.

This process has the additional advantage that steam production, by means of the hot roaster gas, which complicates the apparatus and the operation, is omitted. However, similar steam quantities are obtained from the clean and dry reaction gases after the first and after the last contact stage, which stages permit lower boiler pressures.

In accordance with the German Patent 479,680, cleaned roaster gases containing 6 to 7% of $SO_2$ are catalyzed in two stages, and the formed $SO_3$ is absorbed in two stages. The effluent gases of the first absorption are heated by the reaction heat of the first contact stages to the starting temperature of the second contact stage. Also, roaster gases with 8 or 9% $SO_2$ are processed in this way; however, the heat released in the catalytic $SO_2$-oxidation of one stage suffices only scarcely in order to keep in reaction the next stage.

A similar process in accordance with German published patent application 1,136,988 is concerning roaster gas having 9 to 12% $SO_2$, which concentration is an essential condition for the utilization of relatively small heat exchange surfaces and apparatus cross-sections. This process is suitable preferably for the installation of new roaster and sulfuric acid plants, whereby roasting methods are preferred, which produce gases with high $SO_2$-contents. Existing or new plants, which produce gases with less than 9% $SO_2$ are particularly simple as to their structure and in operation, if they are reconstructed for the method of the present invention. The main advantage resides in the small heat exchange surfaces for the reheating of the effluent gases of the first $SO_3$-absorption. Even if one, due to the dust-content in the roaster gas, must calculate with half the over-all coefficient of heat transmission, 60% of the surfaces suffice, when compared with the known process in which the clean reaction gas from the second contact stage is used for reheating.

It is likewise an object of the present invention in the processing of $SO_2$ gases of any origin to assist in the reheating of the effluent gases of the first absorption by addition of sulfur before the subsequent catalytic stage. In the known methods the exhaust gases of the first absorption cannot always be heated sufficiently by the reaction heat of the previous contact stage to ensure that the contact oxidation will be initiated in the next stage. According to the present invention, pure dry sulfur in the form of solid granules or in liquid form is then added to the gases. At temperatures above 250° C. to 300° C. the sulfur melts and is ignited immediately and very quickly delivers the required heat, in order to maintain the oxidation in the last contact stage. The addition of sulfur appreciably lowers the starting temperatures. Also dried air can be admixed with the gas, preferably sufficient to correspond stoichiometrically to the sulfur addition. The addition of air preferably takes place in the most advantageous manner prior to the heat exchange with the reaction gases.

Pyrite roaster gases originally containing 8% $SO_2$ and 10.5% $O_2$ are converted in the first and second contact stages in a known manner with a 91% yield. After the absorption of $SO_3$, the gas contains 0.8% $SO_2$, 7.6% $O_2$ and 91.6% $N_2$. It is brought by heat generated in the second contact stage to, for example, 375° C., 7.3 g. of ground sulfur are added per Nm.³ and in the last contact stage it is catalyzed with a total conversion of the $SO_2$ between 99.5 to 99.9%. After the sulfur addition, the gases contain 1.3% $SO_2$, 7.1% $O_2$ and 91.6% $N_2$; thus the quotient $(O_2)/(SO_2)=5.5$. If the admixture of an equivalent air quantity precedes the sulfur addition, the quotient $(O_2)/(SO_2)$ increases to 6.2. (Pyrite roaster gases containing 10% $SO_2$ and 8% $O_2$ contain after 91% conversion and removal of $SO_3$ out of the reaction mixture, 1.1% $SO_2$, 4.0% $O_2$ and 94.9%; $N_2$; ($O_2/(SO_2)$ thus only 3.6.)

Figure 3:
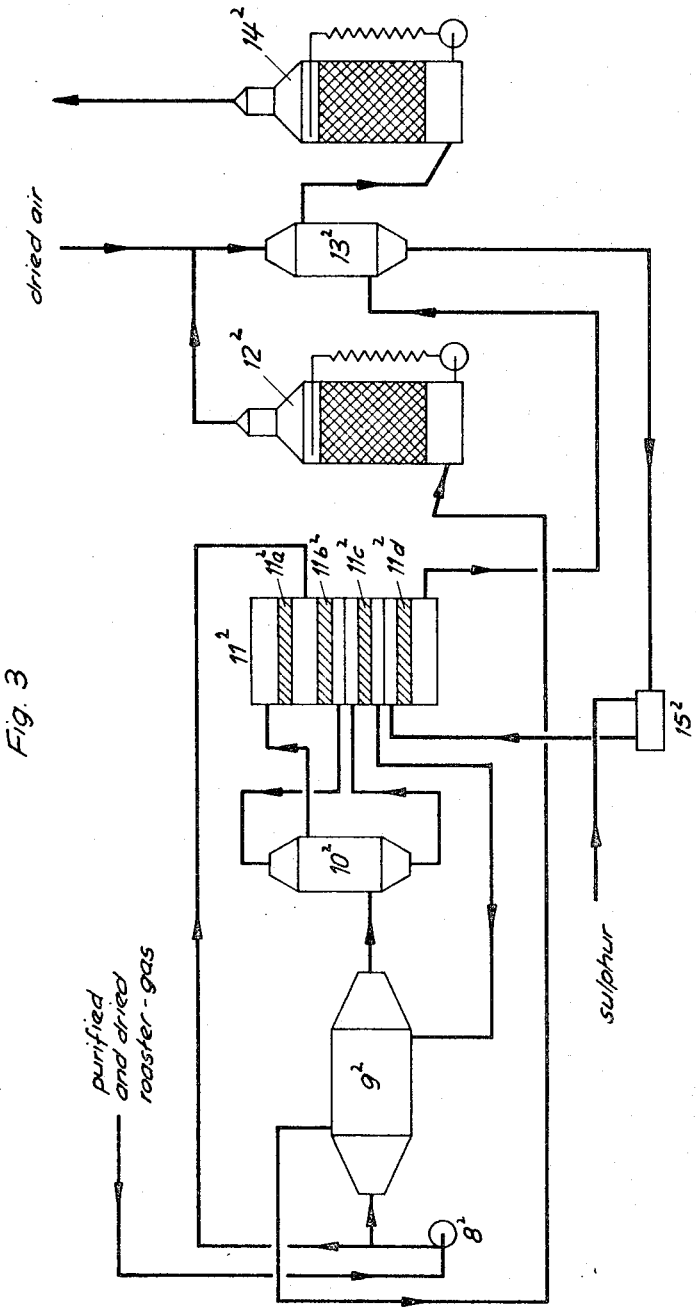

FIGURE 3 shows a scheme of the afore-described process in accordance with the present invention. The blower $8^2$ conveys the cleaned and dried roaster gas through the heat exchangers $9^2$ and $10^2$ into the contact apparatus $11^2$. In the heat exchangers, the reaction gas transfers heat set free in the contact layers $11^2a$, $11^2b$ and $11^2c$, to the roaster gas in order to heat it up to the starting temperature of the layer $11^2a$. After passage through layer $11^2a$, cold roaster gas is admixed for the purpose of temperature control. After the second layer $11^2b$, the gas passes through the intermediate heat exchanger $10^2$ and then to the third layer $11^2c$. The gas, with 85 to 95% of the originally containing $SO_2$-quantity being converted to $SO_3$, flows from the contact apparatus through the heat exchanger $9^2$ and enters into the first $SO_3$-absorber $12^2$. The exhaust gas of the $SO_3$-absorber $12^2$ is admixed with some dried air, reheated in the exchanger $13^2$ to temperatures above 250° C. to 300° C. so that upon addition of sulfur in the mixing chamber $15^2$, further oxidation in the contact layer $11^2d$ is effected and 99.5 to 99.9% of the aforementioned $SO_2$ quantity is converted to $SO_3$. After cooling in the heat exchanger $13^2$, the reaction gas moves through the second absorber $14^2$ and leaves the latter practically free of $SO_3$ and with only 0.1 to 0.5% of the initial $SO_2$ quantity.

In spite of the fact that the remaining $SO_2$ content in the waste gas of the second absorption is appreciably reduced, the necessary heat exchange surface for heating up the effluent gas of the first $SO_3$-absorption is reduced to 50% when compared with known methods for gases with the same $SO_2$ concentration. For 8% $SO_2$-gases it suffices, for instance, to use the same heat exchange surfaces as for 10% $SO_2$-gas with the known process. This is advantageous for air hygienic requirements due to the reduction of air pollution by industrial $SO_2$. This is of importance because tube and apparatus cross sections used in existing plants for 10% $SO_2$ containing gas also suffice for 8% $SO_2$ content feed gases.

The added sulfur is converted with a high yield to sulfuric acid. Since sulfuric acid is produced from sulfur in increased quantities, an expenditure of, for instance, 5% of the total raw material feed as elementary sulfur in addition to 95% in the form of sulfide ores, or hydrogen sulfide, or of waste sulfuric acid, can be sustained in the interest of air hygiene.

It is possible in another embodiment of the method according to the present invention, to blow dry air into the product stream between the different contact layers to increase the oxygen content of the reaction gases. This favorably affects the total conversion of $SO_2$ to $SO_3$ in the multi-stage catalysis and absorption. In the known methods, any dilution of the reaction gases must be avoided, in order that the heat necessary for reheating of the exhaust gases from the first $SO_3$-absorption does not exceed the heat available from the previous contact stages.

EXAMPLE 1

Following the flow-sheet of FIGURE 1, sulfur burner gas containing 10% $SO_2$ and 11% $O_2$ are cooled in a heat exchanger by exhaust gases from the first $SO_3$-absorption. The active heat exchange surface in relation to the plant output per ton $H_2SO_4/d$. is only 1.4 m.² The combustion gases are cooled from 750° C. to 458° C. and the exhaust gases of the first $SO_3$-absorption are heated thereby from 50° C. to 420° C. At this temperature the exhaust gases enter into the last stage of the contact oxidation. The conversion of $SO_2$ to $SO_3$ in the overall contact stages was 99.7%.

EXAMPLE 2

Following the flow-sheet of FIGURE 2, pyrite roaster gas containing 10% $SO_2$ and 8% $O_2$ is cooled in a heat exchanger from 750° C. to 402° C. by the exhaust gas of the first $SO_3$-absorption which is thereby heated from 50° C. to 428° C. The exhaust gas (at this temperature) then enters the last stage of the contact oxidation, in which stage the total conversion of $SO_2$ to $SO_3$ is increased from 90 to 99.6%. The heat exchange surface of the heat exchangers amounted to 3.2 m.² for each ton $H_2SO_4/d$.

If, in accordance with the known method, instead of roaster gas, the reaction gas leaving the first and second contact stage is used for the reheating of the effluent gas of the first absorption, a heat exchange surface per ton $H_2SO_4/d$. of 5.3 m.² would be required, in spite of the fact that the heat exchange would not be interfered with by dust deposits, as it is the case with roaster gases. According to this invention, 2.1 m.² heat exchange surface per ton $H_2SO_4/d$. has been saved.

EXAMPLE 3

Following the flow-sheet of FIGURE 3, pyrite roaster gases containing 10% $SO_2$ and 8% $O_2$ are catalyzed in two contact stages consisting of three layers and a heat exchanger after the second layer, without any addition of air, with a 90% conversion to $SO_3$. In a second heat exchanger with an effective surface of 2.9 m.² per ton $H_2SO_4/d$. the reaction gases have been cooled to 220° C. The reaction gas is then fed through the first $SO_3$ absorber. If compared with the comparable known method in Example 2, second paragraph, the 2.4 m.² heat exchange surface has been saved per ton of $H_2SO_4/d$. The exhaust gases from the same absorber, to which 0.026 Nm.³ of dried air has been added per Nm.² of exhaust gases, are passed as a cooling medium through the aforementioned second heat exchanger, whereby it was heated to 375° C. Prior to its entrance into the last contact stage, 7.9 g. pure liquid sulfur for each Nm.³ gas has been added, in order to heat it to the starting temperature. The total conversion for all the contact stages amounted to 99.5%. The sulfur addition corresponds to 5.4% of the processed sulfur content.

EXAMPLE 4

Pyrite roaster gases containing 8% $SO_2$ and 10.5% $O_2$ have been catalyzed in two contact stages consisting of three layers with a heat exchanger after the second layer. The oxidation results in a temperature between 425° C. and 550° C. and in a conversion of 91% to $SO_3$. The reaction gas is cooled to 130° C. prior to entering the first $SO_3$ absorption in a second heat exchanger with 11.6 m.² effective heat exchange surface for each ton $H_2SO_4/d$. Cooling medium is the exhaust gas of this absorption, which is reheated to 425° C. in order to catalyze the same in a third contact stage with 99.8% overall conversion. The reacted gas passes through a third heat exchanger, where it has been cooled to 147° C., and then into the second $SO_3$ absorption. The low exit temperatures of the reaction gases leaving the second and third heat exchangers show that the known method, when used with roaster gases having 8% $SO_2$, was unsatisfactory with respect to the heat economy. The wall temperatures at the cold ends of the second and third heat exchangers were at about 90° C., thus in a range where $SO_3$ combines with water vapor which remained even after careful demisting and drying of the roaster gases, and sulfuric acid is formed and condensed.

If the gases are processed in the manner described above, except that the exhaust gases of the first $SO_3$-absorber are admixed prior to entrance into the second heat exchanger with 0.025 Nm.³ of dried air per Nm.³ of exhaust gases, the mixture acts as cooling medium in the second heat exchanger and is heated up to 375° C. It is then admixed with 7.5 g./Nm.³ pure liquid sulfur in order to heat it up to the starting temperature of the third contact stage. Using this process a heat exchange surface of 5.3 m.² for each ton $H_2SO_4/d$. will suffice. The reaction gases leave the second and third heat exchanger at 178° C. and 157° C., respectively. The wall temperatures at their cold end were at 105° C., high enough to prevent condensation. The total conversion of $SO_2$ to $SO_3$ amounted to 99.8%.

While we have disclosed several embodiments of the present invention, it is to be understood that these embodiments are given by example only and not in a limiting sense, the scope of the present invention being determined by the objects and the claims.

We claim:

1. In a method for obtaining $SO_3$ from feed $SO_2$-containing gases comprising:
   passing said feed $SO_2$-containing gases through at least one catalytic oxidation stage, whereby a major portion of $SO_2$ is oxidized to $SO_3$,
   then passing said gases through a first $SO_3$ absorption unit, heating the exhaust gases from said $SO_3$ absorption unit to the starting temperature of catalytic oxidation,
   passing said heated exhaust gases through one additional catalytic oxidation stage, whereby substantially all the remaining $SO_2$ is converted to $SO_3$ and
   passing the gases from the last oxidation stage to a second absorption unit,
   the improvement comprising heating said exhaust gases from said first $SO_3$ absorption unit with heat obtained by the direct introduction of sulfur into said exhaust gases and burning said sulfur therein.

2. The method of claim 1, wherein said exhaust gases are preheated to a temperature of at least 250° C. by passage through a heat exchanger using hot exhaust gases from the catalytic oxidation of sulfur dioxide as the heating medium, and are then heated directly to the starting temperature of the last oxidation stage by said direct introduction and burning of sulfur.

3. The method of claim 2, wherein dry air is added to the exhaust gases prior to passing it to the last oxidation stage.

References Cited

UNITED STATES PATENTS

| | | | |
|---|---|---|---|
| 2,163,371 | 6/1939 | Castner | 23—175 |
| 3,142,536 | 7/1964 | Guth et al. | 23—175 |
| 3,259,459 | 7/1966 | Moller | 23—175 X |

FOREIGN PATENTS

| | | |
|---|---|---|
| 1,177,117 | 9/1964 | Germany. |

OSCAR R. VERTIZ, *Primary Examiner.*

A. GREIF, *Assistant Examiner.*

U.S. Cl. X.R.

23—176